April 20, 1954
V. JAWORSKY
2,675,618
SURVEYOR'S ROD
Filed Nov. 13, 1950
3 Sheets-Sheet 1
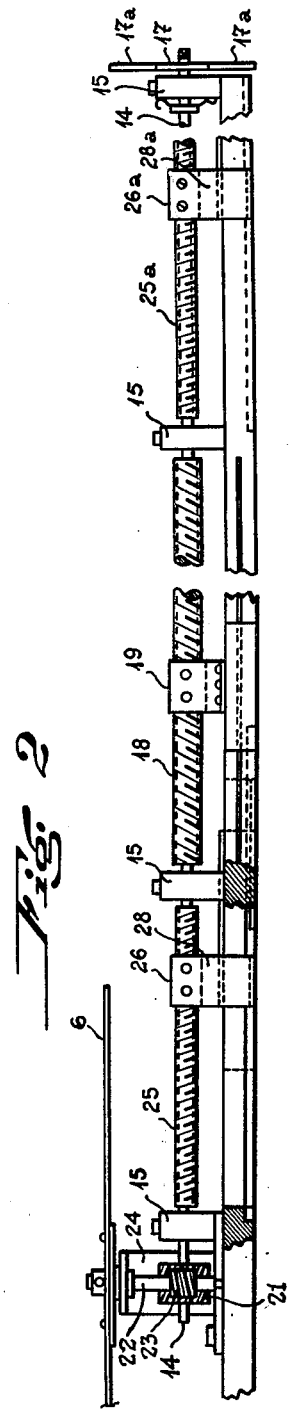
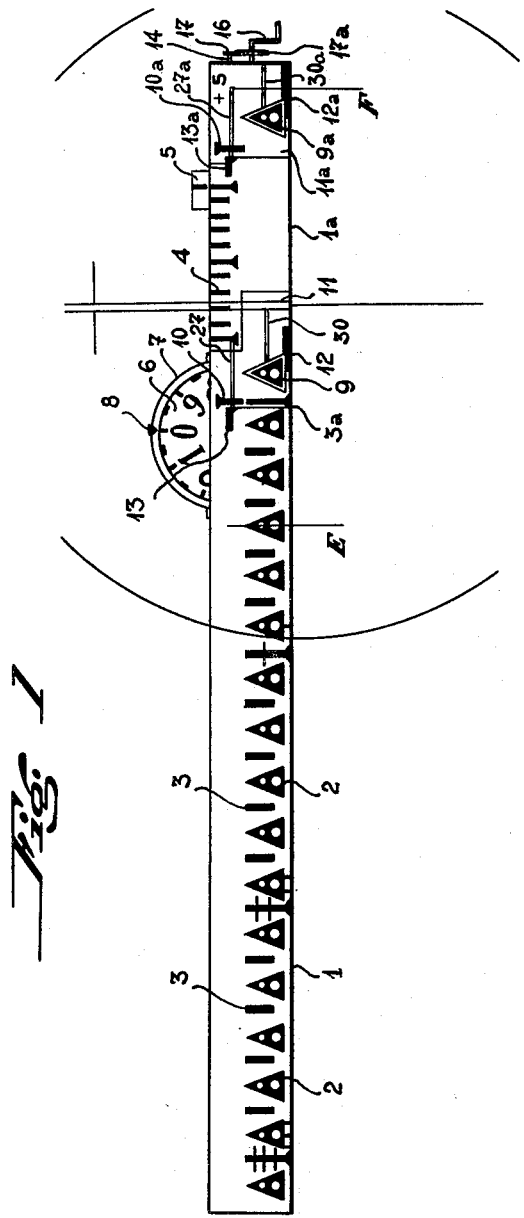

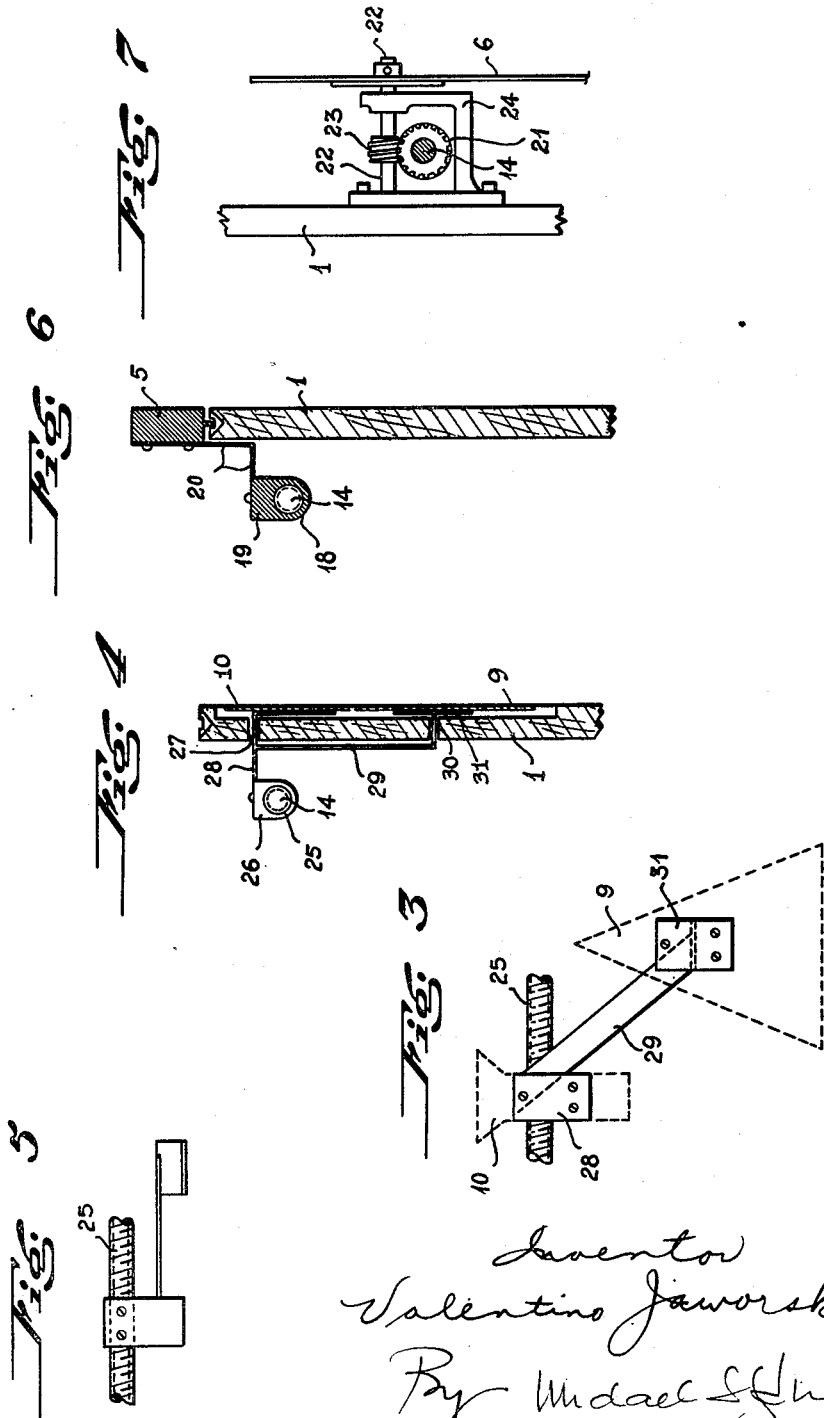

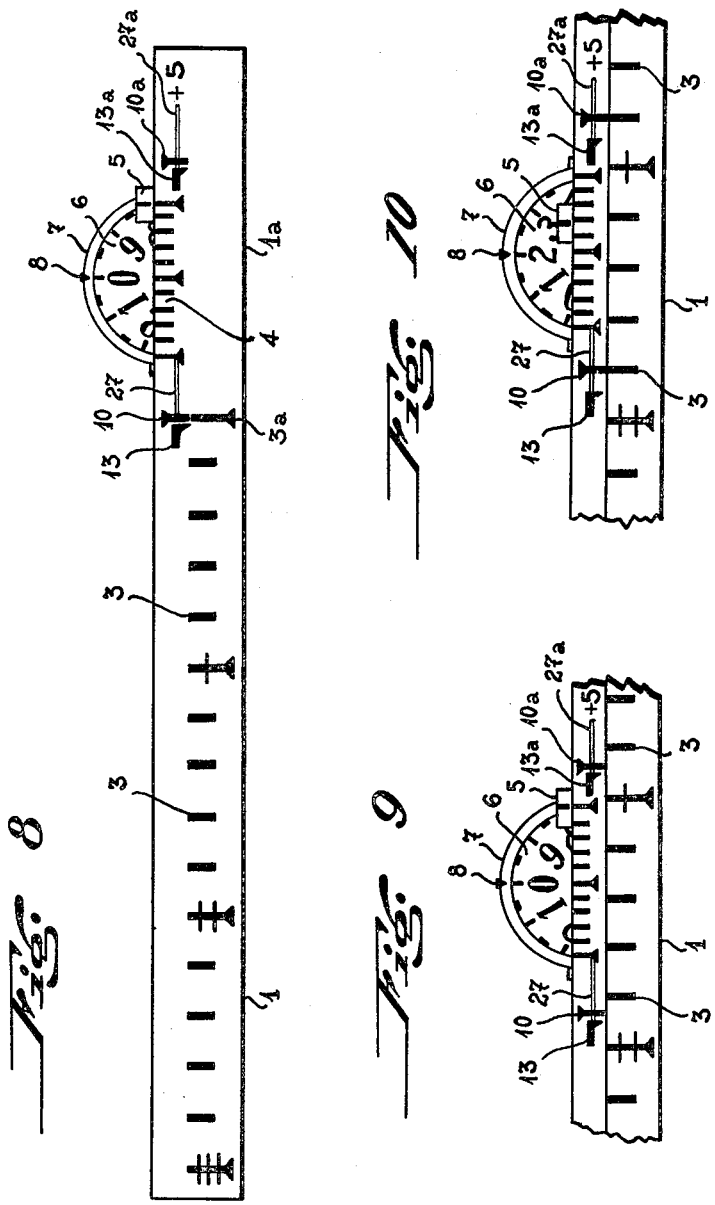

Patented Apr. 20, 1954

2,675,618

UNITED STATES PATENT OFFICE 2,675,618

SURVEYOR'S ROD

Valentino Jaworsky, Villa Ballester, Argentina

Application November 13, 1950, Serial No. 195,200

6 Claims. (Cl. 33—74)

My present invention relates to improvements in surveyor's rods, and more particularly refers to an improved surveyor's rod of the type described in my copending application Serial No. 112,095, including movable fraction-indicating means which enable the surveyor to directly determine in each measuring operation the fraction of the unit of measure used for marking the measuring rod.

The surveyor's rod as described and shown in my said prior application is so constructed that for directly reading through the tachymeter the result of the measuring operation on the surveyor's rod, the fraction-indicating device employs three co-operating indicator disks having relatively large size numerals and being operatively interconnected by means of a rather complicate mechanism. This mechanism, of course, considerably increases the cost of manufacture of the surveyor's rod. If instead of the three indicator disks a movable vernier is used, then it is rather difficult and in most of the cases practically impossible to directly read through the tachymeter on the surveyor's rod a fraction of the unit of measure indicated by said vernier in a measuring operation. Further, the surveyor's rod as described and shown in my prior application may be used only in measuring operations carried out with the aid of tachymeters having the characteristic stadia hairs or say in accordance with the usual tachymetrical method and by no means said surveyor's rod may be used in connection with the so-called "double image" method, wherein by means of a special prism attached to the tachymeter a "double image" of the surveyor's rod or part thereof is produced and the distance to be measured is determined from the relative position of the two images.

Now, the main object of my present invention is to provide an improved surveyor's rod of the type referred to so constructed and arranged that it may be used in connection with both the tachymetrical method and the "double image" method.

Another important object of my invention is to provide an improved surveyor's rod, including a fraction-indicating device of relatively simple and unexpensive construction so arranged that the result of a surveying operation may be in any case directly read on the surveyor's rod through the tachymeter over relatively large distances.

Still another object of my invention is to provide an improved surveyor's rod, including a fraction-indicating device wherein a single rotative indicator disk co-operates with a stationary graduated rule and a slidable indicator associated with said rule in such a manner that the combined values indicated by these elements give the fraction of a unit of measure in each surveying operation, so that such operation is rendered very simple and expeditious.

A further object of the invention is to provide an improved surveyor's rod, including a fraction-indicating device wherein the said indicator disk and said slidable indicator are automatically moved to their respective fraction-indicating position in each surveying operation by the adjustment of slidable control index means, with the advantageous result that accurate measurements are obtained in each case.

An additional object of the invention is to provide an improved surveyor's rod, including a fraction-indicating device, wherein all movable parts are operated from a single driving shaft, with the advantageous result that adjustment of these parts in each surveying operation may be readily and expeditiously performed.

Another object of the invention is to provide an improved surveyor's rod of the type referred to, comprising a rod end portion for carrying the fraction-indicating means as referred to in the preceding paragraphs and a rod portion proper provided with two graduated rules so arranged that the marks of one rule are interposed between those of the other rule and that the two rules only occupy one half of the length of said rod portion proper, so that when working in accordance with the "double image" method the projected image appearing on the other half of said rod portion will not be disturbed by the marks of the two rules.

Still another object of the invention is to provide an improved surveyor's rod of the type referred to, whereon the marks of the said two rules are of different configuration and the control index means of the fraction-indicating device comprise two pairs of slidable plates carrying index marks of like different configuration, the arrangement being such that the marks of one pair of index means and of one of said rules coincide in their configuration and are used for measuring operations in accordance with the tachymetrical method, whereas the marks of the second pair of index means and of the second rule also coincide in their configuration for use in surveying operations carried out according to the "double image" method, whereby the work with this improved surveyor's rod is considerably simplified.

With these objects and advantageous features in view, the present invention comprises the arrangement, combination and construction of parts as will be hereinafter fully described with particular reference to the accompanying drawings, which by way of example illustrate a preferred embodiment of the invention and on which:

Figure 1 is a front view of the improved surveyor's rod according to my invention;

Figure 2 is a fragmentary plan view on a larger scale showing one end portion of the improved rod according to Fig. 1 with the driving mechanism of the fraction-indicating device;

Figure 3 is a detail view on a larger scale showing the connection between two movable index marks, of which one belongs to one pair of the control index means and the other to the second pair of the control index means;

Figure 4 is a detail partly sectional view on a larger scale taken along the line 4—4 of Fig. 2 when looking in the direction of the arrows;

Figure 5 is a detail plan view of the elements shown in Fig. 3;

Figure 6 is a detail sectional view on a larger scale along the line 6—6 of Fig. 1;

Figure 7 is a detail sectional view on a larger scale along the line 7—7 of Fig. 2;

Figure 8 is a front view of the improved surveyor's rod in a simplified embodiment of the invention, for use in connection with the so-called "double image" method only, and Figures 9 and 10 are fragmentary front views of the rod according to Fig. 8, illustrating its operation.

Referring to the accompanying drawings, the improved surveyor's rod, according to my present invention, comprises a measuring rod portion 1 and a rod end portion 1a. The measuring rod portion 1 is suitably provided with two scales graduated by different marks 2 and 3, of which in the embodiment as shown the marks 2 are formed by clearly visible triangles and particularly destined for surveying operations in accordance with the tachymetrical method, whereas the marks 3 are of clearly visible rectangular form and destined more particularly for measuring operations according to the "double image" method. Of course, the marks 2 and 3 may have any other suitable configuration. The same conveniently are so arranged that the marks of one scale are interposed between the marks of the second scale. In this manner it is possible to arrange the two scales on one longitudinal half of the rod surface and to leave blank the other half, with the advantageous result that when working in accordance with the "double image" method the projected image will be clear and undisturbed by the marks of the scales. Each fifth mark 3 from the zero mark 3a is provided with a successively increasing number of cross lines which facilitate the measuring operations and avoid the necessity of numerals on the surveyor's rod.

On the front surface of the rod end portion 1a conveniently on the longitudinal half thereof corresponding to that left blank on the surface of the measuring rod portion 1 there is provided a graduated scale 4 and a slidable fraction indicator 5 cooperating with said rule and having a mark coinciding in its configuration with the marks of the scale 4.

In case the surveyor's rod is prepared in accordance with the decimal system and for a tachymetrical constant =100, the scale 4 has ten equidistant marks and the position of the mark of the movable indicator 5 with regard to the marks of the scale 4 counted from the right to the left indicates the units digit of a metric measurement, whereas the tens digit is read from the graduated scales of the measuring rod portion 1, the successive marks of each scale of this rod portion 1 having a distance of 10 cm. from each other.

Behind the rod end portion 1a there is a second fraction indicator in form of a rotative disk 6 having a graduated periphery portion which in case of using the decimal system is subdivided into ten parts marked by the numerals 0 to 9. The disk partly projects above one longitudinal edge of the rod end portion 1a and behind this projecting portion of the disk 6 there is a fixed member 7 provided with a mark 8 indicating the zero position of the indicator disk 6.

The indicator disk 6 according to its partial rotation from the zero position indicates in each measuring operation the decimeters and centimeters of a measured distance. The dial thus completes the fraction indication by presenting the values in the final decimal places of the reading.

The operation of the indicators 5 and 6 is independent of the measuring method employed and the surveyor may work indifferently in accordance with the tachymetrical method as well as with the "double image" method, in both cases said indicators will correctly give the fraction of a measured distance.

The displacement of the indicators 5 and 6 necessary for each measuring operation is effected by the adjustment of control index means 9, 9a and 10, 10a, which are operatively connected to said indicators so that their adjustment automatically produces the required displacement of the indicators 5 and 6.

The control index means 9, 9a and 10, 10a consist of plates movably arranged in corresponding depressions 11, 11a of the front surface of the rod end portion 1a and provided on their front surfaces with different marks. The control index means 9, 9a for use in connection with measuring operations according to the tachymetrical method have triangular marks according to the respective marks 2 of the measuring rod portion 1, whereas the control index means 10, 10a have rectangular marks coinciding with the marks 3 of said rod portion 1 and being designed for measuring operations according to the "double image" method. The control index marks 9 and 9a, and likewise the marks 10 and 10a have in the example shown a distance of 50 cm. from each other. Conveniently the marked plates of the control index means 9, 9a, 10, 10a are cut so as to form the marks, for instance, in the embodiment as shown the plates 9 and 9a are triangular, whereas the plates 10 and 10a represent vertically arranged rectangles.

With the control index means 9, 9a, 10, 10a, i. e. with the marks provided thereon there are associated four zero marks 12, 12a and 13, 13a, which as shown in Fig. 1 are so arranged that they determine the zero position of the index marks 9, 9a and likewise the marks 10, 10a, and for clearly distinguishing the said zero marks from the index marks, they are presented by horizontally arranged rectangles. Of course, they also may be of any other configuration.

As has been already stated, the index marks 9 and 9a, and 10 and 10a respectively, have in the embodiment as shown a distance of 50 cm. from each other. In the surveying operations one can work with the inner as well as with the outer index marks. When the outer index marks are used, 50 m. have to be added, to the measuring result, because their distance from the marks 2 and 3 of the measuring rod portion 1 is 50 cm. larger than that of the inner index marks and when working with a tachymetrical constant of 100, said distance of 50 cm. is equal to 50 m. in the result of the measuring operation.

For the adjustment or displacement of the control index marks 9, 9a, 10, 10a and of the fraction indicators 5 and 6 all these parts are mechanically interconnected and are operated by a common driving shaft 14 mounted in bearings 15 secured to the back side of the rod end portion 1a. At its end which projects beyond the free end of the rod end portion 1a, the shaft 14 is provided with a small toothed wheel 17 meshing with a second toothed wheel 17a mounted on the shaft of a crank 16. This crank which is to be operated by hand may, of course, be replaced by any other suitable driving mechanism, e. g. a small electric motor.

The driving shaft 14 has a central screw-threaded portion 18 which in the embodiment as shown has a pitch of 3 mm, and which by a complete revolution of the shaft moves a nut member 19 mounted thereon over a distance of 3 mm. This movement is transmitted by means of a connecting rod 20 or the like to the slidable fraction indicator 5 which thus by the operation of the shaft 14 is moved to or fro as the case may be over the graduated rule 4, which has a length of 30 cm. and on which the distance between the graduations is 3 cm., so that the pitch of the screw thread 18 is equal to one tenth of the interval between said graduations.

At its inner end the shaft 14 is provided with a worm 21 meshing with a corresponding worm gear 23 on the shaft 22. This shaft 22 is suitably mounted in a bracket 24 secured to the back side of the rod end portion 1a and its free end projecting beyond said bracket carries the indicator disk 6. The ratio of gearing of the worm and worm gear 21, 23 is, in the embodiment as shown, of 1:10, which means that each revolution of the shaft 14 produces one tenth of a revolution of the disk 6.

The shaft 14 at both sides of the screw 18 has additional screw-threaded portions 25, 25a with a pitch of 1 mm. and with right handed threads, whereas the afore-mentioned screw 18 has left handed threads. On the screw threaded shaft portions 25, 25a there are nut members 26, 26a which by means of connecting rods or like members 28, 28a guided in corresponding slots 27, 27a are rigidly connected to the plates of the control index marks 10, 10a, respectively, so that at each revolution of the shaft 14, these marks are moved over a distance of 1 mm.

The connecting members 28, 28a of the control index marks 10, 10a are connected by means of rods 29, 29a with similar members 31, 31a guided in the slots 30, 30a and secured to the plates of the control index marks 9, 9a, so that these marks are connected indirectly by way of the index marks 10, 10a, to the driving shaft 14 and at each revolution of the latter are also moved over a distance of 1 mm.

The guide slots 27, 27a and 30, 30a cut through the rod end portion 1a not only act as supports for the respective connecting members 28, 28a and 31, 31a and therewith for the control index means 10, 10a and 9, 9a, but at the same time constitute stop means for limiting the movements of the latter.

For executing a surveying operation according to the tachymetrical method one proceeds as follows:

After duly placing the tachymeter and the surveyor's rod at two points the separation of which has to be measured and after duly adjusting the two apparatus in accordance with the rules established for executing surveying operations, on the rod end portion 1a of the surveyor's rod according to this invention the fraction indicators 5 and 6 and the control index marks 9, 9a and 10, 10a are moved to their zero position by correspondingly operating the crank 16 until the vertical lines passing through the vertex of the triangle marks 9, 9a coincide with the vertical lines passing through the left end of the zero marks 12, 12a, respectively. (See Fig. 1.)

Now, the tachymeter (not shown) is adjusted with regard to the surveyor's rod in such a manner that the left stadia hair E (Fig. 1) coincides with the vertex of one of the triangle marks 2 of the measuring rod portion 1 and that the right stadia hair F crosses at any point the inner or outer horizontal zero mark 12 or 12a, in the example illustrated in Fig. 1 the outer mark 12a. After this adjustment of the tachymeter, the surveyor attending to the latter gives a sign to his assistant in charge of the surveyor's rod to operate the crank 16 and to thereby displace the index marks and the indicators until the right stadia hair F coincides with the vertical line passing through the vertex of the index marks 12a, at which moment the surveyor who controls said displacement through the tachymeter gives a new sign to his assistant to stop the operation of the crank 16. As previously stated, the adjustment of the index marks produces the corresponding displacement of the fraction indicators, so that now the result of the measuring operation may be directly read from the surveyor's rod.

Supposed the left stadia hair, prior to the adjustment, coincided with the vertical line passing through the third triangle mark 2, the fraction indicator 5 has been moved to a point between the third and fourth mark of the scale 4 and the mark 8 with regard to the fraction indicator 6 stands between the numerals "6" and "7", but closer to "7" than to "6," the results of the measuring operation is read as follows:

|  | M. |
|---|---|
| The third triangle mark 2 means | 30.00 |
| As the outer index mark 9a has been used there have to be added | 50.00 |
| The third mark of the scale 4 means | 3.00 |
| The indicator 6 shows | 0.67 |
| Distance measured | 83.67 |

If the surveyor operates according to the "double image" method, the index marks 9, 9a are disregarded. It is for this reason that the same are not shown in Figures 8, 9, and 10. Figure 8 shows the surveyor's rod with the fraction indicators 5 and 6 and the control index marks 10, 10a in their respective zero position. If the surveyor looks through his instrument provided with the additional prism capable of producing the double image, so he will see part of the surveyor's rod as shown in Fig. 9. The fraction indicates 5 and 6 as well as the index marks 10, 10a are in their respective zero position. The surveyor now particularly observes the position of the zero marks 13 and 13a which are e. g. situated between the ninth and tenth, and between the fourth and fifth mark 3 respectively of the measuring rod portion 1, but closer to the ninth and fourth mark, respectively, and gives a first sign to his assistant in charge of the surveyor's rod to operate the crank 16 until the index mark 10 coincides exactly with the ninth mark 3 and the index mark 10a with the fourth mark 3, at which moment the surveyor gives a new sign to his assistant to stop the operation of the crank 16. The double image as seen through the optical instrument is now as shown in Fig. 10. The adjustment of the index marks 10, 10a in this case, too, produced a corresponding displacement of the indicators 5 and 6, of which the first one stands e. g. between the third and fourth mark of the scale 4, whereas the mark 6 is between the second and third mark of the disk 6, but very close to the second one. Now the result of the measuring operation is read as follows:

|  | M. |
|---|---|
| The index mark 10 indicates | 90.00 |
| The indicator 5 | 3.00 |
| The indicator 6 | 0.215 |
| Distance measured | 93.215 |

Using the index mark 10a, the result is the same, the first item of the above example being then 40+50=90 m.

As will be readily understood from the above explanations, the improved surveyor's rod according to my invention considerably simplifies the surveying operations. The scales and marks provided on the rod portions are so formed and arranged that the results of the measuring operations may be read through the optical instrument directly on the surveyor's rod over relatively large distances.

It has to be understood that the present invention is by no means restricted to the embodiment as described and shown, but that alterations and amendments may be made in as far as details of construction and arrangement of the fraction-indicating device and its driving mechanism are concerned, and that the scales and index marks may be arranged in accordance with other tachymetrical constants and with systems other than the decimal one, and that such alterations, amendments and different arrangements are to be considered as falling within the scope of the present invention as clearly outlined and set forth in the appended claims.

What I claim and desire to secure by Letters Patent is:

1. A surveyor's rod for use in combination with corresponding geodetic instruments for executing surveying operations according to both the usual tachymetrical method and the so-called "double image" method, comprising a marked measuring rod portion with two graduated scales of differently designed marks on the front surface thereof and as an integral part of said measuring rod portion a rod end portion with an auxiliary graduated scale marked on its front surface; a first slidable fraction indicator movably mounted on a longitudinal edge of said rod end portion and associated with said auxiliary graduated scale; a second rotative fraction indicator disk arranged behind said rod end portion and operatively connected to said first slidable fraction indicator for completing the fraction indication of the latter; at least two different adjustable control index plates on the front surface of said rod end portion, the two plates carrying marks identical respectively with those of the two graduated scales of said marked measuring rod portion, one of said control index plates being rigidly connected with the second one which in turn is operatively connected to said first and second fraction indicators; and a common shaft provided with different worm portions and nut members on the latter for adjusting said control index plates and simultaneously moving said fraction indicators to their respective fraction indicating positions in correspondence with the adjustment of said control index plates in each measuring operation.

2. A surveyor's rod for use in combination with corresponding geodetic instruments according to claim 1, wherein the said control index plates are movably arranged on the front surface of the rod end portion and within flat recesses formed on the latter so that the outer surfaces of said plates and said rod end portion are in the same vertical plane.

3. A surveyor's rod for use in combination with corresponding geodetic instruments according to claim 1, wherein said rod is provided with a plurality of longitudinal slots and wherein there are provided a plurality of angular members, each extending through one of said longitudinal slots and wherein each of said control index plates is secured on its back to one of said angular members and said slots constitute guide means for said index plates.

4. A surveyor's rod for use in combination with corresponding geodetic instruments according to claim 1, further comprising two additional index plates, each marked like a different one of the first recited two plates and both connected for simultaneous movement with, and at equal constant spacing along the rod from, their respective like plates.

5. A surveyor's rod for use in combination with corresponding geodetic instruments according to claim 4, wherein the said common driving shaft comprises a central screw-threaded portion for operating the said first slidable fraction indicator at one drive ratio, a pair of additional screw-threaded portions one at each side of said central screw-threaded portion for operating the said pair of control index means at another drive ratio, a worm gear connected to said second rotative fraction indicator, and a worm in mesh with said worm gear for driving the same through a worm gear the said second rotative fraction indicator.

6. A surveyor's rod for use in combination with corresponding geodetic instruments for executing surveying operations according to either the usual tachymetrical method or the so-called "double image method," comprising a marked measuring rod portion with at least one graduated scale marked thereon along one longitudinal edge thereof and as an integral part thereof a rod end portion with an auxiliary graduated scale marked on its front surface along the opposite longitudinal edge of the rod; a first slidable fraction indicator movably mounted on said rod end portion and associated with said auxiliary graduated scale; a second rotative fraction indicator disk arranged behind said rod end portion and operatively connected to said first slidable fraction indicator for completing the fraction indication of the latter; at least one adjustable control index plate on the front surface of said rod end portion carrying a mark like that of said marked measuring rod portion and being operatively connected to said first and second fraction indicators; and a common driving shaft provided with different worm portions and nut members on the latter for adjusting said control index plate and simultaneously moving said fraction indicators to their respective fraction indicating positions in correspondence with the adjustment of said index plate in each measuring operation.

References Cited in the file of this patent

UNITED STATES PATENTS

| Number | Name | Date |
|---|---|---|
| 1,419,004 | Allen | June 6, 1922 |

FOREIGN PATENTS

| Number | Country | Date |
|---|---|---|
| 39,697 | Austria | Nov. 25, 1909 |
| 511,875 | Germany | Aug. 22, 1931 |